UNITED STATES PATENT OFFICE.

ALFRED R. BOOTH, OF SAN LUIS OBISPO, CALIFORNIA.

POISON FOR SQUIRRELS, GOPHERS, &c.

SPECIFICATION forming part of Letters Patent No. 271,024, dated January 23, 1883.

Application filed November 11, 1882. (No specimens.)

*To all whom it may concern:*

Be it known that I, ALFRED ROGER BOOTH, a citizen of the city and county of San Luis Obispo, State of California, and residing at said city of San Luis Obispo, have discovered a new and useful Compound for the Purpose of Poisoning Squirrels and Gophers; and I do hereby declare the following to be a full, true, and correct description of said compound, such as will enable others skilled in the science to which it appertains to make, compound, and use the same.

The said squirrel and gopher poison is made and compounded as follows: Take cyanide of potassium (granular,) five ounces; strychnine-crystals, (best,) six ounces; Irish moss, one pound; *Cocculus Indicus*, (powdered, fresh,) one-half pound; white glue, one-fourth pound; honey, (strained,) five quarts; oils anise, peppermint, rhodium, and cummin, each sixty drops; flour, sufficient; clean wheat, one hundred pounds. Powder strychnine and mix with honey made thin with water; powder cyanide and mix with two pounds water; dampen wheat with water, and let stand one hour; then add the strychnine and honey and mix well; add mucilage made of Irish moss and hot water, (strained,) and glue; stir in enough flour to partially dry; then add cyanide, quickly adding more flour to prevent evaporation; then add *Cocculus Indicus*, and flour sufficient to thoroughly coat the wheat. Spread upon a floor, and when perfectly dry add the oils, and put in cans. The *Cocculus Indicus* being an outside coating, the animal eating it is stupefied until the poison kills on the spot.

Directions for using: Early in the morning spread about one-fourth of a tea-spoonful in front of each squirrel-hole. After twenty-four hours, if the soil is suitable, it is desirable to go over the ground and close all the holes. A small portion will be reopened, when the same operation may be repeated. Three applications will generally be sufficient to destroy every squirrel; but to insure success the poison should not be used in rainy weather. When green vegetation and young grass first become abundant this poison is less active.

Having set forth my discovery, I claim—

The herein-described compound, which consists of cyanide potassium, (granular,) five ounces; strychnine-crystals, (best,) six ounces; Irish moss, one pound; *Cocculus Indicus*, (powdered, fresh,) one-half pound; white glue, one-fourth pound; honey, (strained,) five quarts; oils anise, peppermint, rhodium, and cummin, each sixty drops; flour or meal, sufficient; clean wheat, one hundred pounds, substantially as set forth.

In testimony whereof I affix my signature in the presence of two witnesses.

ALFRED ROGER BOOTH.

Witnesses:
W. H. SPENCER,
B. G. LATIMER, Jr.